United States Patent
Roytelman

(10) Patent No.: US 7,209,839 B2
(45) Date of Patent: Apr. 24, 2007

(54) REAL TIME POWER FLOW METHOD FOR DISTRIBUTION SYSTEM

(75) Inventor: Ilya Roytelman, Plymouth, MN (US)

(73) Assignee: Siemens Power Transmission & Distribution, Inc., Wendell, NC (US)

( * ) Notice: Subject to any disclaimer, the term of this patent is extended or adjusted under 35 U.S.C. 154(b) by 638 days.

(21) Appl. No.: 10/740,031

(22) Filed: Dec. 18, 2003

(65) Prior Publication Data

US 2004/0243377 A1 Dec. 2, 2004

Related U.S. Application Data

(60) Provisional application No. 60/434,312, filed on Dec. 18, 2002.

(51) Int. Cl.
*G06F 19/00* (2006.01)

(52) U.S. Cl. .......................................... 702/61; 324/222

(58) Field of Classification Search ................. 702/60, 702/188; 324/222, 223
See application file for complete search history.

(56) References Cited

U.S. PATENT DOCUMENTS

2004/0083087 A1* 4/2004 Rehtanz et al. ................ 703/18

OTHER PUBLICATIONS

"A Rigid Approach of Generalized Power Flow Analysis for Distribution Systems"; IEEE Piscataway NJ—Jiansheng Lei et al.; Jul. 2000; pp. 1047-1052; XP-002285643.
"State Estimation for Electric Power Distribution Systems in Quasi Real-Time Conditions"; IEEE New York, NY—I. Roytelman; Oct. 1993; pp. 2009-2015; vol. 8, No. 4; XP000422629.
"A Branch-Current-Based State Estimation Method for Distribution Systems"; IEEE New York, NY; Baran, M.E. et al.; Feb. 1995; pp. 483-491; vol. 10, No. 1; XP000513612.
"State Estimation for Real-Time Monitoring of Distribution Systems"; IEEE New York, Ny; Baran, M.E. et al.; Aug. 1994; pp. 1601-1609; vol. 9, No. 3; XP000484892.
"Three-Phase Cogenerator and Transformer Models for Distribution Systems Analysis"; IEEE Inc., New York, NY; Tsai-Hsiang Chen et al.; pp. 1671-1681; vol. 6, No. 4; XP000271664.
International Search Report, Mailed Jul. 6, 2004.

* cited by examiner

*Primary Examiner*—Edward Raymond

(57) ABSTRACT

A method for determining a power flow in a distribution network includes the step of determining an admittance matrix for a circuit that includes a floating transformer in an electrical power distribution system. The admittance matrix includes an admittance of a fictitious shunt connected between a non-grounded winding of the floating transformer and ground. The method also includes the step of obtaining real time power measurements from a portion of the electrical power distribution system including the floating load transformer. The method further includes solving the power flow using the admittance matrix and the real time power measurements.

7 Claims, 5 Drawing Sheets

REAL TIME POWER FLOW METHOD FOR DISTRIBUTION SYSTEM

This application claims the benefit of U.S. Provisional Patent Application Ser. No. 60/434,312, filed Dec. 18, 2002, which is incorporated herein by reference.

FIELD OF THE INVENTION

The present invention relates generally to methods of determining power flow, and more particularly, to methods of determining power flow in electrical distribution systems.

BACKGROUND OF THE INVENTION

Modeling of the behavior of the electrical power network is of increasing importance in order to ensure reliable electrical service. The electrical power network consists of many interconnected elements, including power generation nodes, transmission systems, distribution systems and loads. Electrical power generators and distribution entities cooperate to achieve delivery of power upon demand. For example, electrical power generation and distribution entities may cooperate to facilitate to transmission of power from Arizona to a high need area in New York City at certain times of day or year, and to facilitate transmission of power from New York state to Arizona at other times of day or year.

In general, the electrical power network can be divided into two main elements, transmission systems and distribution systems. Transmission systems include transmission lines that deliver energy from power generating devices to power substations. Distribution systems are networks that distribute power from the power substations to the individual end-user loads. Distribution systems may also transfer power among themselves.

Transmission systems employ very high voltages, typically on the order of 110 kV to 500 kV AC, and have an interstate extent. Transmission systems transmit power in three phases, and tend to have balanced loads on all three phases. By contrast, distribution systems tend to employ lower distribution voltages (under 66 kV), and typically cover a confined geographical service such as a metropolitan area and its surrounds. While distribution systems are also three phase systems, the loads in distribution systems can be unbalanced due to the presence of two phase and single phase lines and distribution transformers.

Real-time modeling of transmission systems has been used to assist in the efficient allocation of power between power generators and the distribution substations. Real-time models may be generated multiple times per day to determine whether a reallocation in power is required. In the modeling of transmission systems, the distribution systems (i.e. represented by power substations and connected loads) are treated as balanced loads, and thus have composite electrical characteristics that are relatively easy to represent. Moreover, real-time power usage information at the sub-system level is readily available.

Modeling has also been used in distribution systems. However, for several reasons, modeling in distribution systems has typically been limited to non-real time or offline modeling. In particular, unlike transmission systems, real-time power flow measurements at individual loads are not readily available in distribution systems. While the usage of power at individual loads is typically metered (i.e. using electricity meters), the metered power information is typically not available in real time. More specifically, power measurement information from customer electricity meters is usually only retrieved at long intervals, for example, monthly. The lack of real-time power measurement information for the individual loads significantly complicates the development of real-time power flows in distribution systems.

Offline power flows, by contrast, do not require real-time measurement information. Instead, offline power flows employ assumptions about individual loads that suit the problem being addressed. For example, one offline power flow technique assumes full loading of all elements of the distribution network. Such a power flow may be used to identify areas of the distribution network in which increased capacity may be required to ensure proper operation during peak loading times.

Offline power flows, however, have limited usefulness in determining real time resource allocation. Resource allocation in distribution systems is dynamic, and is preferably updated several times per day. Thus, if power flow information is to be used in dynamic resource allocation, then power flows that use real-time power measurements are more desirable than offline power flows.

To satisfy this need, techniques have been developed that generate a real-time power flow in a distribution system using the limited real time power measurements that are available. Such techniques use historical usage information regarding individual loads of a distribution network to estimate power usage based on available real-time power consumption information. For example, real-time power consumption information may be available at different locations on feeder lines, which at least provides some detail as to the power consumption of the distribution system. The historical consumption statistics of various loads connected to the feeders is then used to extrapolate out the measured power consumption to each of the various loads.

For example, consider a situation in which there are three loads on a feeder line, and that real-time measurement information is available for the feeder line. Also consider that two of the loads have roughly the same historical energy consumption record, and that the other load has twice the energy consumption of each of the first two loads. In such a case, the real-time measured energy of the feeder may be allocated at a ratio of 1:1:2. For example, if the real-time measured power on the feeder is 12 kW, it can be assumed that the first two loads are each consuming 3 kW and the third load is consuming 6 kW. This method of allocation in determining real-time power flow is known as scaling.

Thus, through the use of scaling and other techniques known in the art, it is possible to estimate a real-time power flow (details of power usage at each load) for a distribution network having limited real-time power consumption measurement data. Examples of techniques for developing distribution system power flow in this manner are provided in I. Roytelman, S. M. Shahidehpour "State Estimation for Electric Power Distribution Systems in Quasi Real-Time Conditions", *IEEE Trans. On Power Delivery*, Vol. 8, No. 4, 1993, pp. 2009–2015; and M. E. Baran, A. W. Kelley "A Branch-Current Based State Estimation Method for Distribution Systems", *IEEE Trans. On Power Systems*, Vol. 10, No.1, 1995, pp.483–489, both of which are incorporated herein by reference.

However, there are several impediments to achieving an accurate power flow of a distribution system. Such impediments arise from difficulties in modeling certain types of transformers using standard power flow calculation techniques. For example, one common step in developing a standard power flow is to solve Kirchoff's law equations in matrix format: $[I]=[Y][V]$. One of the elements of the matrix equation is the admittance matrix [Y], where admittance is the inverse of impedance. During the power flow solution, the inverse of the admittance matrix must be taken. Under typical power flow circumstances, such an operation presents no great difficulty.

However, there exists a certain class of distribution transformers that raise issues with respect to the matrix equation solution. In particular, certain types of transformers connected in a delta configuration have windings that are not referenced to ground. When such "floating" transformer windings are factored into the matrix equations used to solve the power flow, they can generate a divide by zero error, which does not lead to a power flow solution. Thus, such floating transformer windings present a very real impediment to calculating real time power flow for a distribution system.

In addition, delta connected transformers also raise issues in the application of scaling procedures. In particular, the scaling procedures used to allocate measured composite power consumption to individual loads can break down for loads connected to delta connected transformers. Delta connected transformers introduce phase to phase currents which cannot be scaled using normal techniques.

As a consequence, there remains a need for real-time power flow in electrical distribution systems that overcomes problems presented by ungrounded or floating transformer windings and/or phase to phase loading.

SUMMARY OF THE INVENTION

The present invention addresses the above described need, as well as others, by providing a method of determining real-time power flow for distribution systems that includes steps that enable the characterization of loads connected to delta transformers. One inventive aspect is the implementation of a fictitious shunt that eliminates calculation anomalies. Another inventive aspect is a method that determines and implements scaling factors that account for phase to phase currents. Any of the above aspects may be implemented independently, or preferably as a group.

A first embodiment of the invention is a method for determining a power flow in a distribution network that includes the step of determining an admittance matrix for a circuit that includes a floating transformer in an electrical power distribution system. The admittance matrix includes an admittance of a fictitious shunt connected between a non-grounded winding of the floating transformer and ground. The method also includes the step of obtaining real time power measurements from a portion of the electrical power distribution system including the floating load transformer. The method further includes solving the power flow using the admittance matrix and the real time power measurements.

Another embodiment of the invention is a method of determining a real-time power flow based on measured values that includes the step of generating at least one nodal admittance matrix relating to a power distribution system. The method further includes obtaining measured power related values from the power distribution system. The method also includes determining a power flow using the at least one nodal admittance matrix, the measured power related values and scaling factors, at least some of the scaling factors applied to cross phase power flow values.

Preferably, the method also includes scaling cross phase connected loads using scaling factors from two different phases.

The above described features and advantages, as well as others, may readily be determined by those of ordinary skill in the art by reference to the following detailed description and accompanying drawings.

DETAILED DESCRIPTION

Figure 1:
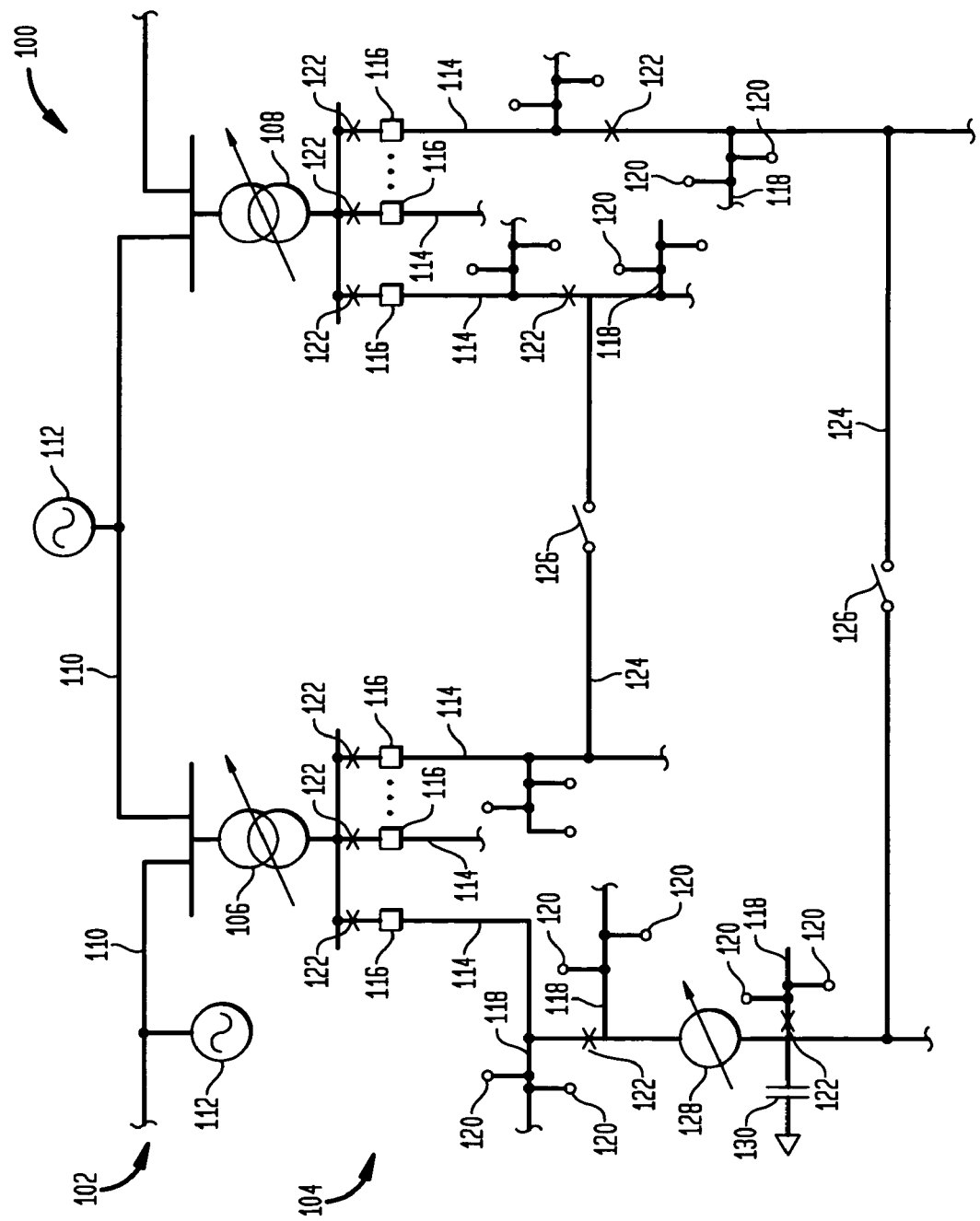
FIG. 1 shows a schematic representation of a portion of an exemplary electrical power network for which a real-time power flow may be determined in accordance with the present invention.

FIG. 1 shows a schematic representation of a portion of an electrical power network 100 to which aspects of the present invention may be applied. The network 100 includes a transmission network 102, a distribution network 104, and a number of substations in between the transmission network 102 and the distribution network 104. In the portion of the network 100 shown in FIG. 1, two substations 106 and 108 are disposed between the networks 102 and 104.

The transmission network 102 includes high voltage transmission lines 110 and a number of three phase power generators 112. Each of the first and second substations 106 and 108 connects to the transmission lines 110. The power generators 112 connect to the transmission lines 110 via three phase transformers, not shown; but which are known in the art. It will be appreciated that any number of other power generators and substations, as well as other components, may be connected to the transmission lines 110.

The distribution network 104 includes a number of feeders lines 114 emanating from the power substations 106 and 108, a number of branch feeders 118 emanating from each feeder line 114, and a number of distribution transformers 120. The feeder lines 114 connect to the power substations 106 or 108 through circuit breakers 116. Branch feeders 118 can be three phase, two phase or single phase, as is known in the art. Distribution transformers 120 may three phase or single phase. Multiple single phase transformers may be combined into banks of two or three transformers that are connected to the same loads but on different phases.

A power measurement device 122 is typically disposed at or near the circuit breakers 116 of each feeder 114. The power measurement devices 122 are devices that are operable to measure power and/or energy flow. By way of example, the power measurement devices 122 may be Supervisory Control and Data Acquisition ("SCADA") devices, which are known in the art. Preferably, power measurement devices 122 are disposed at various points throughout the distribution network.

The distribution network 104 also includes a number of crossfeeder lines 124 that connect different feeders 116. Crossfeeders 124 are used to assist in balancing load distribution between substations (e.g. 106, 108) and feeders 116. The crossfeeders 124 include a switch 126 to allow selective connection of the crossfeeder 124.

Feeders 116 within the distribution network 104 may also include voltage regulation devices such as voltage regulators 128 and capacitors 130. The capacitors 130 may be switchably connected to the distribution network 104 such that the capacitors 130 only affect the operation of the distribution network 104 at select times. The use of voltage regulators 128 and capacitors 130 for regulation and control of voltage levels is well known in the art.

In operation, generators 112 generate power for transmission over the transmission lines 110 at high voltage, for example 110 kV. The power substations 106 and 108 convert the voltage to a lower level, for example, 20 kV, for propagation over the feeders 114 and subfeeders 118. The transmission network 102 and distribution network 104 deliver energy in three phases, typically referred to as phase A, phase B and phase C. Each of the phases has a similar voltage magnitude, but has a different phase angle with respect to the other phases.

Power flows through the feeders 114 to the branch feeders or subfeeders 118 and then to the distribution transformers 120. The distribution transformers 120 thereafter connect to the customer load, not shown (but see, for example, FIG. 7, discussed further below). The distribution transformers 120 may take many forms, including single phase transformers, banks of two or three single phase transformers connected to the different phases of the same node, and three phase transformers. In addition, transformers may be connected phase to ground or phase to phase. Such distribution transformer types, and their variants, are well known in the art.

In accordance with at least some embodiments of the invention, a real time power flow of the distribution network 104 is generated. A power flow, as is known in the art, is a collection of values representative of a relatively detailed model of voltage, current and/or power flow values within an electrical power system. A real-time power flow is a power flow using real-time measured values to formulate the power flow. The real-time measured values may consist of power or energy measurement values obtained at various points of the system, for example, the measurement devices 122.

Figure 2:
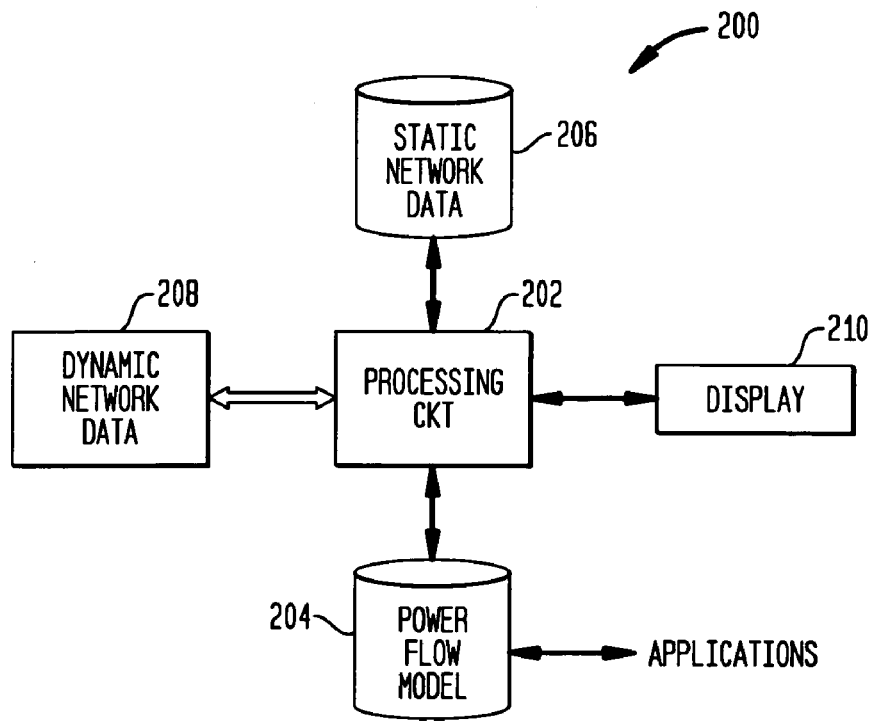
FIG. 2 shows a schematic block diagram of an exemplary system configured to generate a real-time power flow in accordance with the present invention.

FIG. 2 shows an exemplary system 200 that is operable to generate real-time power flows in accordance with the present invention. The system 200 of FIG. 2 includes a processing circuit 202, a power flow model store 204, a static network data store 206, and a source of dynamic network data 208.

The processing circuit 202 is preferably a general purpose computer that includes a display 210 and other devices associated with computers, such as disk drives, data I/O, a user interface, and the like, not shown in FIG. 2. The processing 202 is operable to obtain information from the static network data store 206 and the source of dynamic network data 208 to generate a real-time power flow of a distribution network, such as the distribution network 104 of FIG. 1. Further detail regarding the operation of the processing circuit 202 is provided below in connection with FIGS. 3, 4 and 5.

The power flow model store 204 is one or more physical elements of memory that maintain power flow values generated by the processing circuit 202. The power flow model store 204 is preferably accessible by one or more applications that use the power flow model to, for example, alter the configuration of the distribution network. Such applications might use the power flow model to identify nodes or branches (i.e. transformers or lines) of the network that are operating at or near capacity and require corrective action. Such corrective action may include, for example, altering the status of crossfeeder switch such as the switches 126 of FIG. 1. Other corrective actions may include connecting or disconnecting a capacitor on the feeder, such as the capacitor 130 of FIG. 1. Real-time power flow models may also be used to identify lossy feeders, subfeeders or distribution transformers. Those of ordinary skill in the art may readily devise various uses for real time power flow models in distribution systems.

The static network data store 206 is one or more storage devices that maintain data representative of the electrical parameters of the elements of the distribution network. Referring to FIG. 1, such electrical parameters may include impedances of the feeders 114, subfeeders 118, and distribution transformers 120. These electrical parameters also include identification of the type of phase connections (wye/wye, wye/delta, open wye/delta etc.) of the transformers 120. The parameters may also include values for any capacitors 130.

The static network data store 206 may also include initial scaling factors for loads as determined by historical consumption data or otherwise.

The dynamic network data source 208 is one or more servers and/or communication devices that provide access to data regarding network topology and real-time measurements. Referring to FIG. 1, the dynamic network data source 208 may suitably be a data server or the like that is operably connected to devices that provide data regarding the status of each of the switches 126, the measurement devices 122, and whether certain other elements (e.g. capacitors 130) have been disconnected. To this end, for example, the dynamic network data source 208 may be a server to which SCADAs and similar devices are connected.

It is noted that the static network data store 206, the dynamic network data source 208, and/or the power flow model store 204 may share one more or more components.

Figure 3:
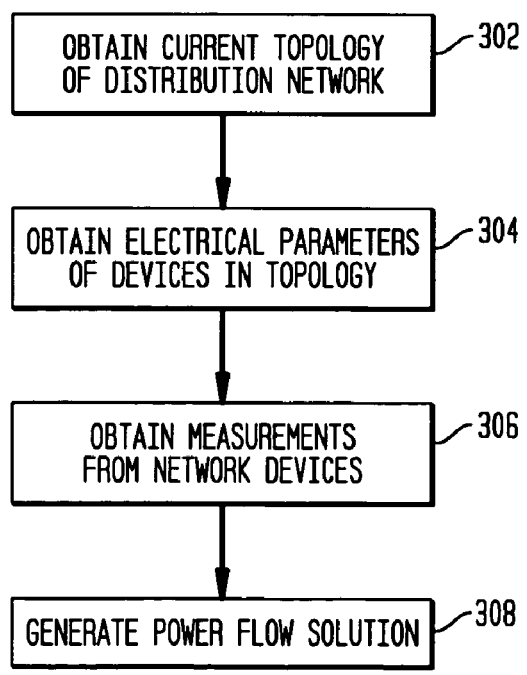
FIG. 3 shows an exemplary set of operations that may be employed to generate a real-time power flow in accordance with the present invention.
Figure 4:
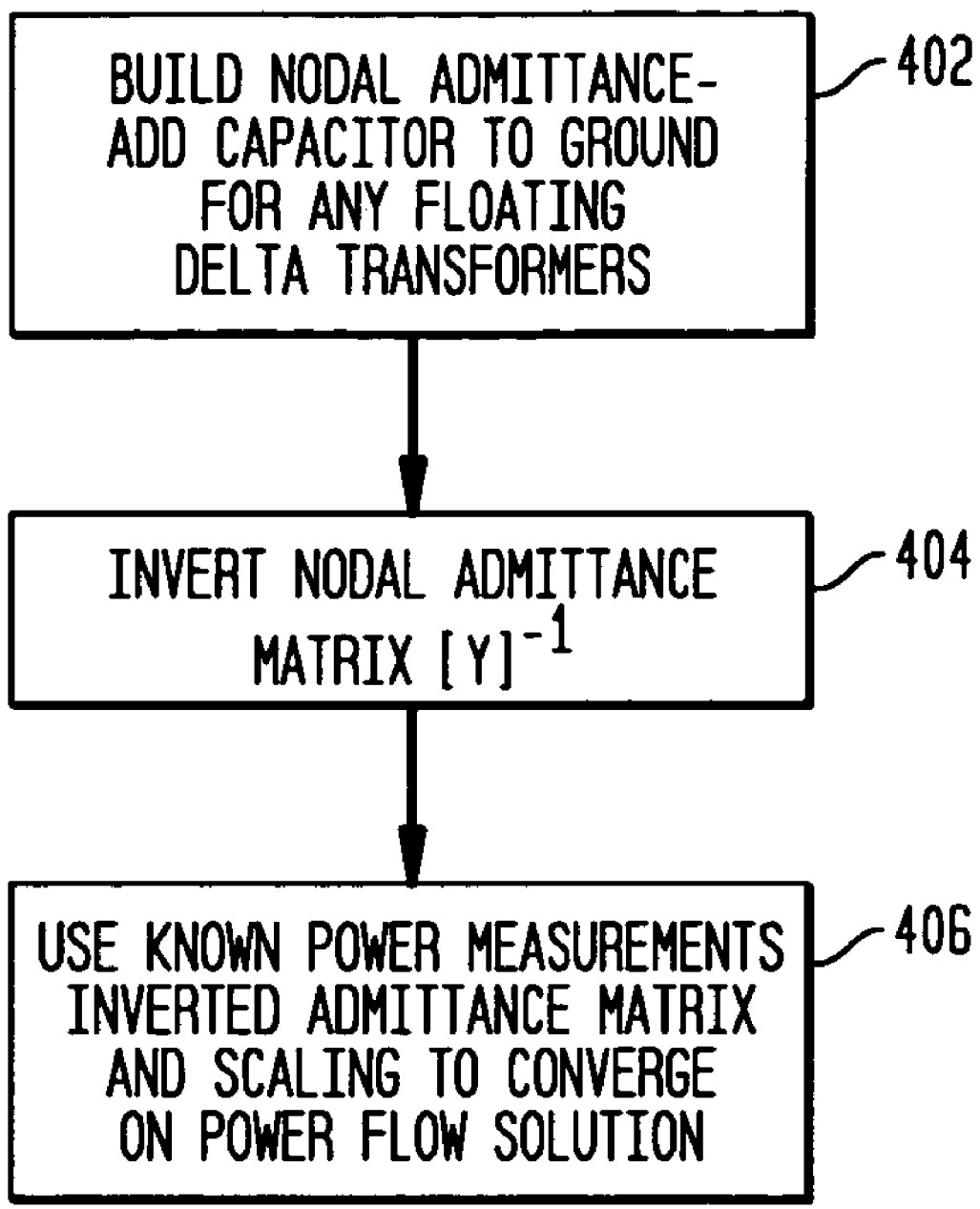
FIG. 4 shows in further detail an exemplary set of operations employed in the step of solving the power flow of FIG. 3.
Figure 5:
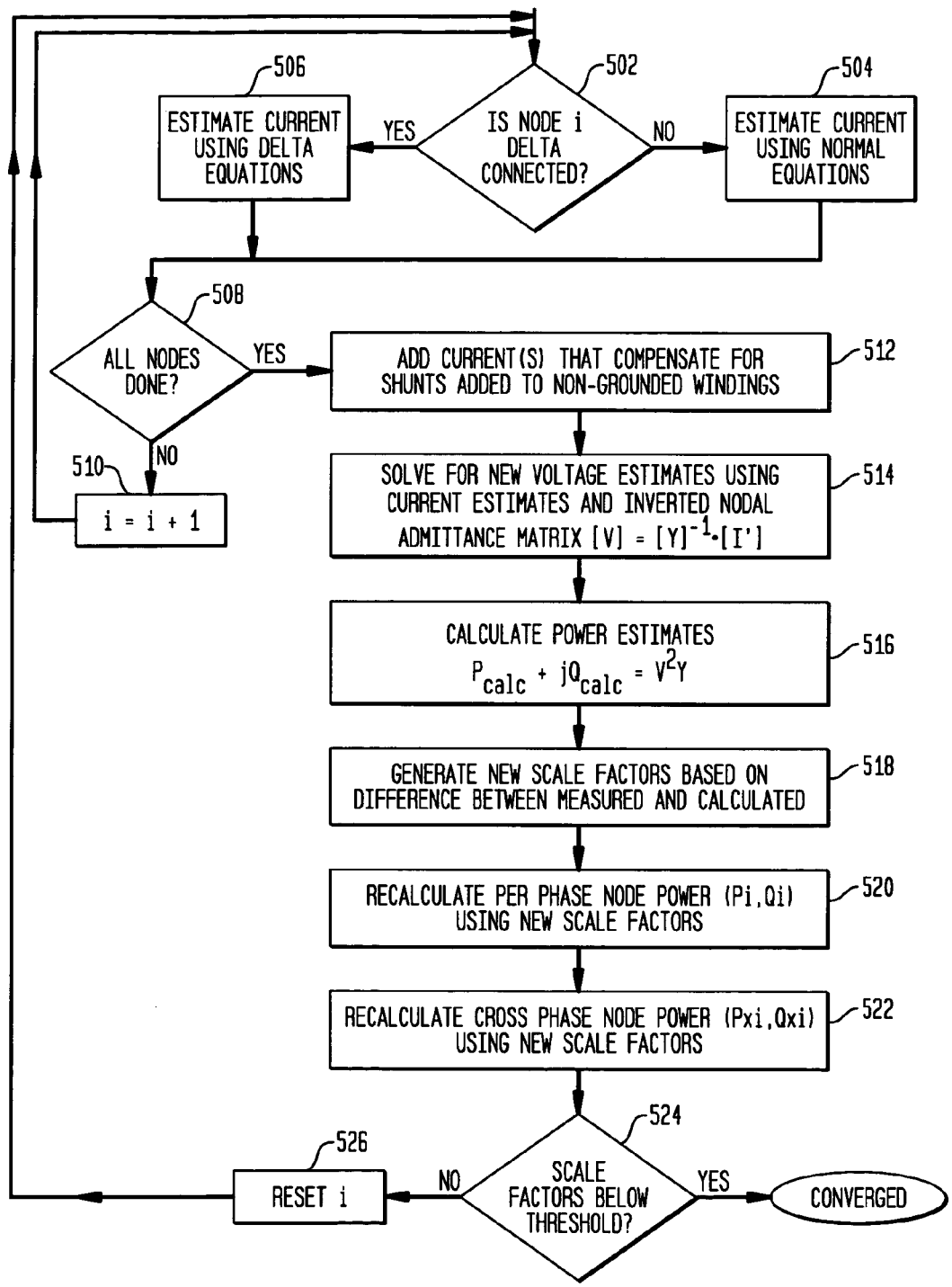
FIG. 5 shows in further detail an exemplary set of operations employed in the step of converging upon a solution of FIG. 4.

The operation of the system 200 is described below in connection with FIG. 3–5. In particular, FIGS. 3–5 show an exemplary set of operations performed by the processing circuit 202 to generate a real-time power flow based on information obtained from the static network data store 206 and the dynamic network data source 208. The processing circuit 202 may then provide the real-time power flow to the power flow model store 204 where it may be accessed by other applications, not discussed in detail herein. The operations of FIGS. 3–5 will be described with reference to the exemplary distribution network 104 shown in FIG. 1. However, it will be appreciated that the operations of FIGS. 3–5 are generally applicable to other distribution networks.

FIG. 3 shows an overview of an exemplary set of operations of the processing circuit to generate a real-time power flow. In step 302, the processing circuit 202 obtains information regarding the current topology of the distribution network 104. The general topology the distribution network 104 is defined by largely permanent physical structures and therefore is somewhat static and constant. However, the specific topology at any one time may be dynamically changed based on the status of the switches 126, whether certain capacitors such as the capacitor 130 are connected, and whether one or more transformers 120 feeders 114 or subfeeders 118 are disconnected. Thus, the processing circuit 202 obtains information regarding such conditions from the dynamic network data source 208. The processing circuit 202 may use that information to determine the present topology of the network 104 from the dynamic network data source 208.

In step 304, the processing circuit 202 obtains electrical parameters of the devices in the present topology of the network 104. The electrical parameters may include the impedance or admittance values of elements of the network (such as feeders 114, subfeeders 118, circuit breakers 116, etc.), the wiring configuration of distribution transformers 120 (wye, delta, grounded or floating, etc.), and other electrical parameters. The processing circuit 202 receives the electrical parameters from the static network data store 206.

In step 306, the processing circuit 202 obtains real-time measurement information regarding the distribution network 104. Such real-time measurement information may include power or energy measurements, power factor information, voltage measurements, and/or current measurements. Such information is obtained by the various measurement devices 122 and is provided to the processing circuit 202 through the dynamic network data source 208.

In step 308, the processing circuit 202 generates a power flow solution using the power-related measurements, the present network topology, and the parameters of devices in the distribution network 104. Because the power flow solution uses present topology and recent/present measurements, the power flow solution represents a real-time power flow. The processing circuit 202 may suitably store the real-time power flow information in the power flow model store 204.

FIG. 4 shows in further detail an exemplary set of operations that may be used step 308 to generate the real-time power flow. In general, the steps of FIG. 4 operate to project the known power measurements, which are relatively sparse within the network 104, onto the individual elements and loads on the network 104. The steps of FIG. 4 may be used to project the known measurements of a particular measurement device 122 to all the devices downstream of the measurement device 122. The steps of FIG. 4 may then be repeated for other measurement devices 122 until a solution for a desired portion of the distribution network 104 is achieved.

Figure 6:
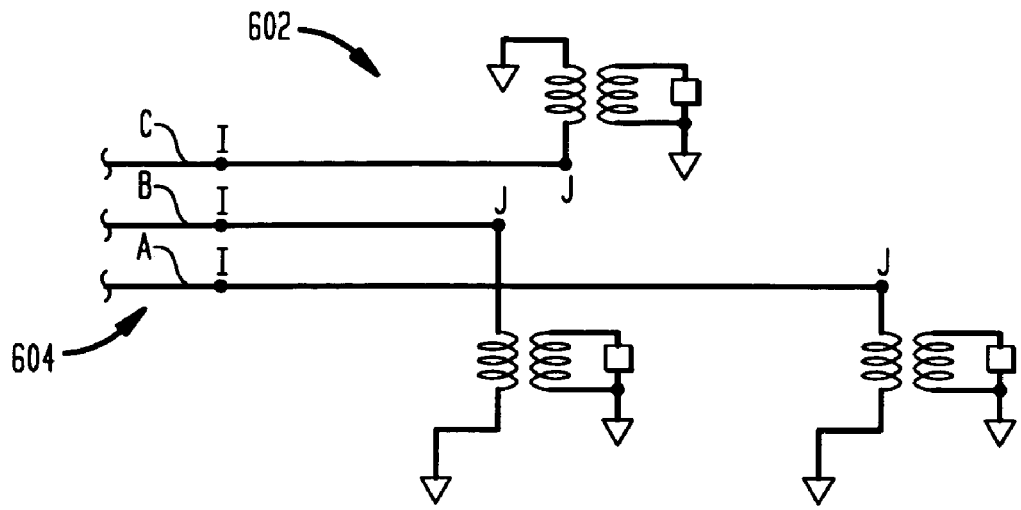
FIG. 6 shows a schematic of an exemplary distribution line to which the operations of FIGS. 3, 4 and 5 may be applied.

In step 402, the processing circuit 202 generates a node admittance matrix for a select portion of the distribution network 104. FIG. 6 shows an example of a portion 602 of the distribution network 104 that has a known measurement point 604 and that corresponds to a location of a select measurement device 122.

Node admittance matrices for three phase network presentation are known, and are described in general in W. H. Kersting, "Distribution System Modeling and Analysis", (CRC Press, 2001); and D. Anderson, B. F. Wollenberg "Solving for Three Phase Connectivity Isolated Busbar Voltages Using Phase Component Analysis", *IEEE Trans. On Power Systems*, Vol. 10, No. 1, 1995, pp.98–105, both of which are incorporated herein by reference.

In general, the node admittance matrix is square N×N matrix where N is equal to the number of nodes in the select portion of the distribution network 104. If any two nodes I, J are connected by a branch (feeder or transformer, for example branch 606 of FIG. 6), the branch admittance is located in the matrix at the position I, J and J, I. Each of the diagonal elements of the matrix (e.g. J, J and I, I) includes the sum of all admittances connected to all branches of the relevant node (e.g. J and I).

The nodal admittances describes the three phases of the distribution network 104. As a consequence, each branch admittance is included in the node admittance matrix as a small sub-matrix (3×3 for three phase branches, 2×2 for two phase branches, and a single value for a one phase branch). The internal structure of the matrices that describes distribution transformers is determined by the transformer type of connection (wye/wye, wye/delta, open wye/open delta etc.). For further detail regarding the description of distribution transformers in a nodal admittance matrix, please see D. Anderson & B. F. Wollenberg (cited above); A. Tan, W. H. E. Liu, D. Shirmohammadi "Transformer and Load Modeling in Short Circuit Analysis for Distribution Systems", *IEEE Trans. On Power Systems*, Vol. 12, No. 3, 1997, pp.1315–1321; and A. Berman, W. Xu "Analysis of Faulted Power Systems by Phase Coordinates", *IEEE Trans. On Power Delivery*, Vol. 13, No. 2, 1998, pp. 587–595, which are incorporated herein by reference.

In the course of step 402, the processing circuit 202 also inserts the admittance of fictitious shunts, a shunt being a device or circuit connected between the node and ground, in the nodal admittance matrix when characterizing the admittances for certain circuits. In particular, the processing circuit 202 inserts a fictitious shunt for transformers having delta-connected windings that are non-grounded.

Figure 7:
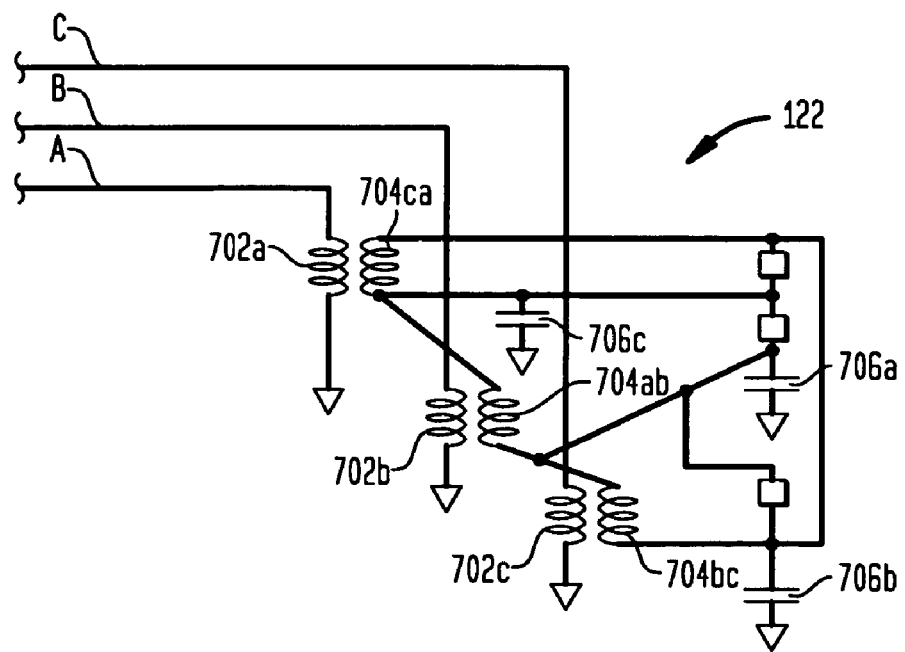
FIG. 7 shows a schematic of a second exemplary distribution line that includes a floating transformer to which the operations of FIGS. 3, 4 and 5 may be applied.

FIG. 7 shows a schematic diagram of a subfeeder branch that includes a distribution transformer set $122_1$ that is made up of three delta connected single phase transformers $702ab$-$704ab$, $702bc$-$704bc$, and $706ac$-$706ac$, each of which has a non-grounded winding. Referring to FIG. 7a, the distribution transformer set $122_1$ includes three primary windings $702a$, $702b$ and $702c$, and three secondary windings $704ab$, $704bc$ and $704ac$. The three secondary windings $704ab$, $704bc$ and $704ac$ are coupled to each other, but none are physically connected to ground. Hence, the secondary windings $704ab$, $704bc$ and $704ac$ are considered to be floating windings.

In accordance with aspects of the invention, when the processing circuit 202 forms the node admittance matrix that includes the transformer $122_1$, the processing circuit 202 adds admittances corresponding to fictitious impedances that are connected to ground. These fictitious impedances are illustrated in FIG. 7a as fictitious capacitors 706a, 706b, 706c that are connected to the secondary windings 704ab, 706bc and 706ca. These capacitors 706a, 706b, 706c help avoid divide by zero errors when the nodal admittance matrix [Y] is inverted in step 404, discussed below. It is noted that processing circuit 202 also adds compensating currents on phases connected to the primary of transformers 702a, 702b and 702c to negate the effects of the fictitious capacitors 706a, 706b and 706c. (See step 512 of FIG. 5). This compensation current is equal to (but has the opposite sign of) the amount of current fictitiously created by the capacitors 706a, 706b and 706c.

In step 404, the processing circuit 202 inverts the nodal admittance matrix [Y] to generate an inverted nodal admittance matrix $[Y]^{-1}$. The matrix inversion operation is well known in the art.

Thereafter, in step 406, the processing circuit uses the nodal admittance matrix, the measurements and scaling factors for the distribution network 104 to converge upon a power flow solution. Scaling factors, as discussed further above, are factors that are used to allocate a known power consumption value to various individual loads connected to the node that has the known power consumption value. For example, if two loads are connected to a known power measurement point, and the first load typically consumes three times the power of the second load, then if the measurement point has a measurement value of 100 watts, scaling factors are used to identify that the first load is consuming approximately 75 watts and the second load is consuming approximately 25 watts.

In the embodiment described herein, scaling factors are also used to scale interphase loads caused by unbalanced delta transformers. In particular, delta connected transformers, such as those of the transformer set $122_1$ illustrated in FIG. 7a, can have different power ratings, and therefore different loads. For example, the transformers 702ab-704ab, 702bc-702bc, and 702ac-704ac may have different loads if they have different power ratings. If transformer power ratings are equally, then the loads are balanced and the loads may be represented as equally distributed as phase A, phase B and phase C loads. However, to the extent that one transformer rating is different than the others, one load is different than another (e.g. the load on 704ab is greater than the load on 704bc and 704ac), then some phase to phase loading has occurred which affects two phases.

In accordance with the embodiments described herein, the scaling factors for each phase may be applied to such phase to phase loads. As will be discussed below, the scaling factors are applied differently to the balanced and unbalanced portions of each phase to phase load.

In particular, when phase to phase loading is present, power flow may be characterized as having two components, a balanced delta load component and an unbalanced phase to phase load component. The balanced delta load component is based on the power flow that is common to all of the relevant delta connected loads. For example, the balanced load component of the transformer set $122_1$ of FIG. 7 is based on the smallest power flow of the 704ab, 704bc and 704ac windings, which is common to all of the windings. The unbalanced load component for each winding 704ab, 704bc and 704ac is based on the difference between the total phase to phase flow on each winding and the common power flow component.

Thus, referring again to FIG. 7, if the smallest transformer is the transformer 702ab-704ab, then the power on the transformer 702ab-704ab defines the balanced portion of the load for all three transformers 702ab-704ab, 702bc-704bc and 702ac-704ac. The incremental difference between the total power for 702bc-704bc and the balanced portion constitutes the unbalanced portion of the b-c phase to phase load. Similarly, the incremental difference in power between the total power for 702ac-704ac and the balanced portion constitutes the unbalanced portion of the a-c phase to phase load.

As mentioned above and discussed in further detail below in connection with FIG. 5, scaling factors are applied in different ways to balanced portions and the unbalanced portions of the phase to phase loads.

In general, the initial scaling factors may be derived from historical billing information or billing statistics. In particular, because each load on the distribution network 104 is typically coupled to a billing meter, usage information regarding many or all of the loads is available from which scaling factor may be estimated.

In any event, using the inverted nodal admittance matrix $[Y]^{-1}$, the known measurements, and the initial scaling factors, sufficient values are available to converge upon a solution in which the measured power consumption may be relatively accurately allocated to each branch of the relevant portion of the distribution network 104.

FIG. 5 shows in further detail an exemplary set of operations that may be used to converge on a solution of the real time power flow as per step 406 of FIG. 4. Essentially, the calculations are based on Kirchoff's laws. The iterative process of FIG. 5 effectively guesses at how to allocate the known measured power to the various nodes and branches on the network 104 based on initial scaling factors. As the guess is attempted to be verified through the application of Kirchoff's laws, errors will appear. Those errors are used as new scaling factors that modify the "guess" for the next iteration. The process is then repeated until the errors are close to zero, indicating convergence. The process in FIG. 5 is preferably performed for each set of nodes that are downstream of a particular measurement node. A measurement node is a node at which a power measurement (and/or other measurements) are available. Thus, the measurement node corresponds to the location of a measurement device 122. The process of FIG. 5 is performed for each phase (A, B, C) of the system 104.

Referring now to the flow diagram, the processing circuit 202 first generates current estimates for each node i in the portion of the distribution network 104 in question. To this end, in step 502, the processing circuit 202 determines whether the node i is delta connected. If not, then the processing circuit 202 proceeds to step 504 to estimate node current using techniques normally used for phase to ground loading. If so, however, then the processing circuit 202 proceeds to step 506 to estimate the node current using a technique that incorporates phase to phase loading considerations.

In step 504, the processing circuit 202 generates a current estimate for a node i using the equation:

$$I'_{\phi i} = [P_{\phi i}\{V_{\phi i}\} + jQ_{\phi i}\{V_{\phi i}\}]/V^{\Delta}_{\phi i}$$

where $I'_{\phi i}$ is a present current estimate for phase $\phi$ for a load at the node i, $P_{\phi i}\{V_{\phi i}\}+jQ_{\phi i}\{V_{\phi i}\}$ are the phase $\phi$ active and reactive power values (as a function of the voltage estimate $V_{\phi i}$ of node i), and $V^{\Delta}_{\phi i}$ is the complex conjugate of $V_{\phi i}$. The $P_{\phi i}\{V_{\phi i}\}+jQ_{\phi i}\{V_{\phi i}\}$ values are allocated to the node i using scaling factors. The processing circuit 202 then proceeds to step 508.

In step 506, the processing circuit 202 uses the unbalanced phase to phase portion of delta connected loads and the balanced portions of the delta connected loads to generate current estimates for each phase. The phase to phase currents $I_{abi}$, $I_{bci}$, $I_{aci}$ for the node i are obtained using the following relationships:

$$I_{abi} = \frac{[(Pbal_{abi} + Punb_{abi}) + j(Qbal_{abi} + Punb_{abi})]}{(V_{ai} - V_{bi})^{\Delta}}$$

$$I_{bci} = \frac{[(Pbal_{bci} + Punb_{bci}) + j(Qbal_{bci} + Punb_{bci})]}{(V_{bi} - V_{ci})^{\Delta}}$$

$$I_{aci} = \frac{[(Pbal_{aci} + Punb_{aci}) + j(Qbal_{aci} + Punb_{aci})]}{(V_{ai} - V_{ci})^{\Delta}}$$

where, $Pbal_{\phi\theta i}+jQbal_{\phi\theta i}$ is the balanced portion of the phase $\phi$ to phase $\theta$ power allocated to the node i, $Punb_{\phi\theta i}+jQunb_{\phi\theta i}$ is the unbalanced portion of the phase $\phi$ to phase $\theta$ power allocated to the node i, and $V_{\phi i}$ is an estimate of the phase $\phi$ voltage at the node i which is implied from the service level, and $V^{\Delta}_{\phi i}$ is the complex conjugate of $V_{\phi i}$.

The initial values of $Pbal_{\phi\theta i}$, $jQbal_{\phi\theta i}$, $Punb_{\phi\theta i}$, and $jQunb_{\phi\theta i}$ may be derived from historical loading information of the node i or a combination of other factors. Afterwords, such values are modified by the steps of the process described herebelow.

Thereafter in step 506, the phase to phase current values $I_{abi}$, $I_{bci}$, $I_{aci}$ are combined to yield the individual phase currents i for the node.

$$I_{ai}=I_{abi}+I_{aci}$$

$$I_{bi}=I_{bci}+I_{abi}$$

$$I_{ci}, I_{bci}+I_{aci}$$

Once the individual phase currents $I_{ai}$, $I_{bi}$, $I_{ci}$ for the node i have been estimated in step 506, the processing circuit 202 then proceeds to step 508.

In step 508, the processing circuit 202 determines whether current estimates have been generated for all nodes up to the measurement node. Thus, if there are M nodes in the portion of the network for which the power flow is currently being solved (i.e. everything down from the measurement node), then in step 508 the processing circuit 202 determines whether i=M. If so, then all of the current estimates for the M nodes are complete and the processing circuit 202 proceeds to step 512. If not, however, then the processing circuit 202 increments i in step 510 and returns to repeat step 502. The resulting currents 11 for the nodes i may be arranged in a matrix represented herein as [I].

In step 512, the processing circuit 202 adds a compensating current that negates the effect of the fictitious shunt that was added to the nodal admittance matrix in step 402 of FIG. 4. To this end, the processing circuit 202 determines a compensating current that is the inverse of the fictitious phase to ground current flowing through the fictitious shunt, and then adds the compensating current to the current matrix [I].

In step 514, the processing circuit 202 solves for new voltage estimates using the equation $[V_{calc}]=[Y]^{-1}\cdot[I]$. The resulting voltage matrix $[V_{calc}]$ provides a set of voltages $V_{icalc}$ that represent calculated interim estimates of the voltages $V_i$ used in steps 504 and 506.

In step 516, the processing circuit 202 calculates a set of power estimates using the voltage estimates from the matrix $[V_{calc}]$ and the node admittance matrix [Y]. The power is summed over all M nodes to provide a final power value $P_{calc}+jQ_{calc}$ associated with a reference point for the set of M nodes in the network 104. As discussed above, the set of M nodes are chosen such that they have a measurement point, i.e., a point at which there is a measurement device 122, as a reference point.

In step 518, the processing circuit 202 then uses the difference between the total calculated power for the set of M nodes and the measured power for the same set of M nodes to generate updated scaling factors for each node i. Scaling factors for both real power P and reactive power Q are generated for each of the three phases.

Sample scaling factor calculations are set forth below for a phase A.

$$SFP_{ai} = \frac{P_{meas(a)} - P_{calc(a)}}{\sum P_{ia} \text{ for } i=1 \text{ to } M}$$

$$SFQ_{ai} = \frac{Q_{meas(a)} - Q_{calc(a)}}{\sum Q_{ia} \text{ for } i=1 \text{ to } M}$$

where $SFP_{ai}$ is the new scale factor for the real power on phase A of node i, and $SFQ_{ai}$ is the new scale factor for the reactive power on phase A of node i. The same equations apply in a like manner for phases B and C.

In step 520, the processing circuit 202 recalculates the estimated real power $P_i$ and reactive power $Q_i$ at each node i using the scaling factors $SFP_i$ and $SFQ_i$, respectively, for each phase. The estimated real and reactive power $P_i$ and $Q_i$ are employed for non-delta connected nodes i only. Estimated real and reactive power for delta connected loads are determined in step 522, discussed further below. The results of step 520 are used in the next iteration of step 504, if another iteration is necessary. To obtain the estimated real and reactive power $P_i$ and $Q_i$, the following calculations are used:

$$P_{\phi i(new)}=P_{\phi i}i+P_{\phi i}(SFP_{\phi i}) \text{ for each individual phase } \phi;$$
and $$Q_{\phi i(new)}=Q_{\phi i}+Q_{\phi i}(SFQ_{\phi i}) \text{ for each individual phase } \phi$$

In step 522, the processing circuit 202 recalculates the estimated phase to phase power for each delta connected node i using the scaling factors $SFP_i$ and $SFQ_i$. The operations of step 522 are used for delta connected nodes i only. The results of step 522 are used in the next iteration of step 506, if another iteration is necessary.

To obtain the estimated real and reactive power $P_i$ and $Q_i$, the unbalanced and balanced portions for each phase are obtained separately. For balanced portions, i.e., $Pbal_{\phi\theta i}$ and $Qbal_{\phi\theta i}$, the following equations are used:

$$Pbal_{abi(new)}=Pbal_{abi}+Pbal_{abi}(SFP_{ai}), Qbal_{abi(new)}=Qbal_{abi}+Qbal_{abi}(SFP_{ai})$$

$$Pbal_{bci(new)}=Pbal_{bci}+Pbal_{bci}(SFP_{bi}), Qbal_{bci(new)}=Qbal_{bci}+Qbal_{bci}(SFP_{bi})$$

$$Pbal_{aci(new)}=Pbal_{aci}+Pbal_{aci}(SFP_{ci}), Qbal_{aci(new)}=Qbal_{aci}+Qbal_{aci}(SFP_{ci})$$

For unbalanced portions, i.e., $Punb_{\phi\theta i}$ and $Qunb_{\phi\theta i}$, the following equations are used:

$$Punb_{ab(new)}=Punb_{ab}+Punb_{ab}(SFP_a),$$

$$Qunb_{ab(new)}=Qunb_{ab}+Qunb_{ab}(SFP_a)+Qunb_{ab}(SFQ_b-SFP_a)$$

$$Punb_{bc(new)}=Punb_{bc}+Punb_{bc}(SFP_b),$$

$$Qunb_{bc(new)}=Qunb_{bc}+Qunb_{bc}(SFP_b)+Qunb_{bc}(SFQ_c-SFP_b)$$

$$Punb_{ac(new)}=Punb_{ac}+Punb_{ac}(SFP_c),$$

$$Qunb_{ac(new)}=Qunb_{ac}+Qunb_{ac}(SFP_c)+Qunb_{ac}(SFQ_a-SFP_c)$$

The respective balanced and unbalanced power values are maintained for each node and are used in step 506, as discussed above. After step 522, the processing circuit 202 proceeds to step 524.

In step 524, the processing circuit 202 determines whether the scaling factors $SFP_i$ and $SFQ_i$ are below a threshold. If so, then the solution has been converged upon and the operation is completed for this phase of the group of M nodes in the relevant portion of the network. The process may then be performed for another set of M' nodes, the set of M' nodes emanating from another measurement node. The process is also repeated for each phase of the three phase power system for each set of M' nodes.

If, however, in step 524, the processing circuit 202 determines that the scaling factors $SFP_i$ and $SFQ_i$ are not below a threshold, then the processing circuit 202 performs another interation. To this end, the processing circuit 202 resets i to 1 in step 526 and returns to step 502.

Thus, the present invention provides additional advantages that allow for more accurate real-time power flow calculation. The embodiment described above provides an improvement in the use of a fictitious capacitor and corresponding current element to enable the determination of a nodal admittance matrix in systems having floating delta transformers. The embodiment described above also provides an improvement in the use separate scaling factors for cross phase power flow, and in particular, where scaling factors of two phases are used to scale cross phase reactive power components and a scaling factor of one phase is used to scale cross phase real power components. Each of the above advantages may be obtained independent of the other, but the use of both is particularly beneficial.

It will be appreciated that the above described embodiments are exemplary, and that those of ordinary skill in the art may readily devise their own implementations and modifications that incorporate the principles of the invention and fall within the spirit and scope thereof.

I claim:

1. A method for determining a power flow in a distribution network comprising: a) determining an admittance matrix for a circuit that includes a floating transformer winding in a electrical power distribution system, the admittance matrix including an admittance of a fictitious shunt connected between a floating transformer winding and ground; b) obtaining real time power measurements from a portion of the electrical power distribution system including the floating load transformer; and c) solving the power flow using the admittance matrix and the real time power measurements.

2. The method of claim 1 wherein step a) further comprises determining the admittance matrix wherein the admittance matrix includes the admittance of a fictitious capacitive shunt.

3. The method of claim 1 wherein step c) further comprises:

c1) determining a set of current values using a set of estimated voltage values and estimated real and reactive power components, the estimated real and reactive power components based on the real time power measurements;

c2) determining a set of subsequent voltage values using the admittance matrix and the set of determined current values;

c3) determining calculated power components using the admittance matrix and the set of subsequent voltage values; and c4) determining new estimated real and reactive power components based on a difference between the calculated power components and the real time power measurements.

4. The method of claim 3 further comprising adding a fictitious current to the set of current values, the fictitious current corresponding to the fictitious shunt.

5. The method of claim 1 wherein step c) further comprises:

solving the power flow using the admittance matrix, the real time power measurements and scaling factors.

6. The method of claim 5 wherein at least some of the scaling factors are applied to cross phase power flow values.

7. The method of claim 6, wherein step c) further comprises scaling a cross phase real power value using a scaling factor of a first phase; and scaling a cross phase reactive power value using a scaling factor of the first phase and a scaling factor of a second phase.

* * * * *